US009232335B2

(12) United States Patent
Carlsson et al.

(10) Patent No.: US 9,232,335 B2
(45) Date of Patent: Jan. 5, 2016

(54) NETWORKED SPEAKER SYSTEM WITH FOLLOW ME

(71) Applicant: SONY CORPORATION, Tokyo (JP)

(72) Inventors: Gregory Peter Carlsson, Santee, CA (US); Keith Resch, San Diego, CA (US); Oscar Manuel Vega, Chula Vista, CA (US)

(73) Assignee: Sony Corporation, Tokyo (JP)

( * ) Notice: Subject to any disclaimer, the term of this patent is extended or adjusted under 35 U.S.C. 154(b) by 113 days.

(21) Appl. No.: 14/199,137

(22) Filed: Mar. 6, 2014

(65) Prior Publication Data

US 2015/0256954 A1  Sep. 10, 2015

(51) Int. Cl.
| | | |
|---|---|---|
| *H04B 3/00* | (2006.01) | |
| *H04S 7/00* | (2006.01) | |
| *H04R 27/00* | (2006.01) | |
| *H04N 21/442* | (2011.01) | |

(52) U.S. Cl.
CPC ............... *H04S 7/303* (2013.01); *H04R 27/00* (2013.01); *H04N 21/44227* (2013.01); *H04R 2227/005* (2013.01); *H04R 2420/07* (2013.01); *H04S 7/301* (2013.01); *H04S 7/308* (2013.01)

(58) Field of Classification Search
CPC ............. H04S 7/303; H04S 3/00; H04S 7/00; H04S 7/307; H04S 1/007; H04S 7/302; H04R 29/001; H04R 2420/07; H04R 29/00; H04R 1/00; H04R 5/04; H04R 3/005; H04R 5/02; H04R 3/02; H04N 21/25891; H04N 21/43615; H04N 21/8106; H04N 21/6125; H04N 21/6587; H04N 21/4108; H04N 21/44227; H04N 21/4852; H04N 21/6377; H04N 21/482; H04B 3/00; H04B 7/00; G10H 2210/305; G10H 2240/211; G10H 2240/321; G10H 2240/175; G10H 2240/311; H04M 2250/02; H04M 1/7253; H04M 1/72558; H03G 1/02; H03G 3/3089; H03G 3/005; H04L 12/2809; H04L 29/12226; H04L 2012/2849; H04L 61/2015; H04L 67/16; H04L 7/0008; H04H 40/00; G06F 17/30017; G06F 17/30899; G06F 3/048; G06F 3/165; G06F 3/16; G06F 3/167; G06F 17/3074; H04W 40/00
USPC ......... 381/81, 59, 17, 105, 56, 104, 300, 107, 381/80, 82, 85, 77, 123, 58, 2; 370/338; 455/41.2, 3.06; 709/203, 201, 217, 709/223; 704/2; 340/524; 715/733; 714/4.1; 700/94

See application file for complete search history.

(56) References Cited

U.S. PATENT DOCUMENTS

| | | |
|---|---|---|
| 6,008,777 A | 12/1999 | Yiu |
| 7,689,613 B2 | 3/2010 | Candelore |
| 8,068,095 B2 | 11/2011 | Pryor |
| 8,079,055 B2 | 12/2011 | Hardacker et al. |
| 8,296,808 B2 | 10/2012 | Hardacker et al. |
| 8,320,674 B2 | 11/2012 | Guillou et al. |
| 8,438,589 B2 | 5/2013 | Candelore |
| 8,614,668 B2 | 12/2013 | Pryor |
| 8,621,498 B2 | 12/2013 | Candelore |
| 8,629,942 B2 | 1/2014 | Candelore |

(Continued)

*Primary Examiner* — Vivian Chin
*Assistant Examiner* — Ubachukwu Odunukwe
(74) *Attorney, Agent, or Firm* — John L. Rogitz

(57) ABSTRACT

In a multi-speaker audio system for, e.g., a home entertainment system or other entertainment system, each networked-speaker (wired or wireless) is activated or deactivated as appropriate such that audio play follows a user as the user moves around the home.

14 Claims, 7 Drawing Sheets

(56) References Cited

U.S. PATENT DOCUMENTS

| | | |
|---|---|---|
| 2001/0037499 A1 | 11/2001 | Turock et al. |
| 2002/0054206 A1 | 5/2002 | Allen |
| 2002/0122137 A1 | 9/2002 | Chen et al. |
| 2003/0046685 A1 | 3/2003 | Srinivasan et al. |
| 2003/0107677 A1 | 6/2003 | Lu et al. |
| 2003/0210337 A1 | 11/2003 | Hall |
| 2004/0068752 A1 | 4/2004 | Parker |
| 2005/0024324 A1 | 2/2005 | Tomasi et al. |
| 2005/0125820 A1 | 6/2005 | Nelson et al. |
| 2006/0195866 A1 | 8/2006 | Thukral |
| 2008/0025535 A1* | 1/2008 | Rajapakse ............ H04L 65/605 381/311 |
| 2008/0207115 A1* | 8/2008 | Lee .................... H04M 1/7253 455/3.06 |
| 2008/0259222 A1 | 10/2008 | Hardacker et al. |
| 2008/0279453 A1 | 11/2008 | Candelore |
| 2008/0313670 A1 | 12/2008 | Ho et al. |
| 2009/0037951 A1 | 2/2009 | Candelore et al. |
| 2009/0041418 A1 | 2/2009 | Candelore et al. |
| 2009/0150569 A1 | 6/2009 | Kumar et al. |
| 2009/0172744 A1 | 7/2009 | Rothschild |
| 2009/0313675 A1 | 12/2009 | Howarter et al. |
| 2010/0260348 A1* | 10/2010 | Bhow ................ H04N 21/25891 381/81 |
| 2011/0157467 A1 | 6/2011 | McRae |
| 2012/0011550 A1 | 1/2012 | Holland |
| 2012/0158972 A1 | 6/2012 | Gammill et al. |
| 2012/0174155 A1 | 7/2012 | Mowrey et al. |
| 2012/0220224 A1 | 8/2012 | Walker |
| 2012/0254931 A1 | 10/2012 | Oztaskent et al. |
| 2012/0291072 A1 | 11/2012 | Maddison et al. |
| 2012/0320278 A1 | 12/2012 | Yoshitani et al. |
| 2013/0003822 A1 | 1/2013 | Margulis |
| 2013/0042292 A1 | 2/2013 | Buff et al. |
| 2013/0052997 A1 | 2/2013 | Killick et al. |
| 2013/0055323 A1 | 2/2013 | Venkitaraman et al. |
| 2013/0109371 A1 | 5/2013 | Brogan et al. |
| 2013/0205319 A1 | 8/2013 | Sinha et al. |
| 2013/0210353 A1 | 8/2013 | Ling et al. |
| 2013/0229577 A1 | 9/2013 | McRae |
| 2013/0237156 A1 | 9/2013 | Jung et al. |
| 2013/0238538 A1 | 9/2013 | Cook et al. |
| 2013/0249791 A1 | 9/2013 | Pryor |
| 2013/0298179 A1 | 11/2013 | Baum et al. |
| 2013/0309971 A1 | 11/2013 | Kiukkonen et al. |
| 2013/0310064 A1 | 11/2013 | Brachet et al. |
| 2013/0312018 A1 | 11/2013 | Elliot et al. |
| 2013/0317905 A1 | 11/2013 | Warner et al. |
| 2013/0321268 A1 | 12/2013 | Tuck et al. |
| 2013/0325396 A1 | 12/2013 | Yuen et al. |
| 2013/0325954 A1 | 12/2013 | Cupala et al. |
| 2013/0326552 A1 | 12/2013 | Adams |
| 2013/0332957 A1 | 12/2013 | Deweese et al. |
| 2014/0004934 A1 | 1/2014 | Peterson et al. |
| 2014/0009476 A1 | 1/2014 | Vinkitaraman et al. |
| 2014/0011448 A1 | 1/2014 | Yang |
| 2014/0026193 A1 | 1/2014 | Saxman et al. |

* cited by examiner

NETWORKED SPEAKER SYSTEM WITH FOLLOW ME

I. FIELD OF THE INVENTION

The present application relates generally to distributed wireless speaker systems.

II. BACKGROUND OF THE INVENTION

People who enjoy high quality sound, for example in home entertainment systems, prefer to use multiple speakers for providing stereo, surround sound, and other high fidelity sound. As understood herein, optimizing speaker settings for the particular room and speaker location in that room does not lend itself to easy accomplishment by non-technical users, who moreover can complicate initially established settings by moving speakers around.

SUMMARY OF THE INVENTION

As understood herein, in a whole-home audio system, the user may travel between locations and therefore desire the sound to follow him. For example, a user moving from his living room to his kitchen to prepare a meal may wish for a kitchen speaker to be automatically activated when he enters the kitchen. Present principles permit use of a user's smart phone, mobile device, or a tag (RF, Wi-fi, UWB, or other wireless technology) to track the user's location within the home to enable switching networked speakers on and off based on user location or proximity to each network speaker. This not only provides convenience for the user since he need not provide any input to effect the speaker change, but also saves power by allowing speakers not within range of the user to be turned off. Thus, as the user moves, speakers in the home are activated or deactivated automatically.

Accordingly, a system includes at least one computer readable storage medium bearing instructions executable by a processor, and at least one processor configured for accessing the at least one computer readable storage medium to execute the instructions to configure the at least one processor for receiving, at first and second locators positioned with respective first and second speakers, predetermined wireless signals from an electronic device associated with a user. The processor when executing the instructions is configured for determining whether the electronic device is within a threshold distance of the first speaker based at least in part on the wireless signals and/or lack of reception thereof by the first locator. The processor when executing the instructions is configured for determining whether the electronic device is within a threshold distance of the second speaker based at least in part on the wireless signals and/or lack of reception thereof by the second locator. Responsive to determining that the electronic device is within the threshold distance of the first speaker, the processor when executing the instructions is configured for activating the first speaker to play audio if not already activated. Responsive to determining that the electronic device is not within the threshold distance of the first speaker, the processor when executing the instructions is configured for deactivating the first speaker if already activated. Responsive to determining that the electronic device is within the threshold distance of the second speaker, the processor when executing the instructions is configured for activating the second speaker to play audio if not already activated, and responsive to determining that the electronic device is not within the threshold distance of the second speaker, the processor when executing the instructions is configured for deactivating the second speaker if already activated.

In some examples, the first speaker is in a first room of a building and the second speaker is in a second room of the building different from the first room. If desired, responsive to determining that the electronic device is within the threshold distance of the first speaker, the at least one processor when accessing the instructions can be configured for activating the first speaker to play audio currently being played on a home entertainment system in which the first speaker is networked.

In example implementations, responsive to determining that the electronic device is within the threshold distance of the first speaker, the at least one processor when accessing the instructions may be configured for activating the first speaker to play a default audio that is not audio currently being played on a home entertainment system in which the first speaker is networked. The at least one processor when accessing the instructions may be configured for determining that the electronic device is within the threshold distance of the first speaker based on detecting the wireless signals regardless of a signal strength of the wireless signals received by the first locator. Or, the at least one processor when accessing the instructions can be configured for determining that the electronic device is within the threshold distance of the first speaker based on detecting the wireless signals at the first locator having a signal strength satisfying a threshold signal strength greater than zero, and otherwise not determining that the electronic device is within the threshold distance of the first speaker. The non-limiting processor when accessing the instructions may be configured for determining that the electronic device is within the threshold distance of the first speaker by directly determining a distance from the electronic device to the first speaker. The wireless signals can be established by one or more of radiofrequency identification signals, Wi-fi signals, Bluetooth signals, ultra wideband signals.

In another aspect, a system includes at least one computer readable storage medium bearing instructions executable by a processor, and at least one processor configured for accessing the at least one computer readable storage medium to execute the instructions to configure the at least one processor for receiving, at at least a first locator distanced in a building from at least first and second speakers located in respective first and second rooms of the building, predetermined wireless signals from an electronic device associated with a user. The processor when executing the instructions is also configured for accessing a speaker list, determining, based on the wireless signals, which speaker(s) in the list are closest to the electronics device, and based at least in part on the determining, activating or not activating the speakers.

In another aspect, a method includes receiving at a controller a message from an electronics device reporting a location of the electronics device. The method includes accessing a speaker list correlating speakers with locations of speakers within a building, and activating, if not already activated, "N" speakers on the list nearest the location of the electronics device, wherein "N" is an integer at least equal to one.

In another aspect, a device includes at least one computer readable storage medium bearing instructions executable by a processor and at least one processor configured for accessing the at least one computer readable storage medium to execute the instructions to configure the at least one processor for presenting on a display a user interface (UI). The UI includes a first selector selectable to enable logic to activate and deactivate speakers in a building as a user moves in the building, and a second selector selectable to disable logic to activate and deactivate speakers in a building as a user moves in the building. The UI also includes a third selector selectable to direct the logic to activate speakers only within a room in which the user is located, maintaining all other speakers in the building deactivated, and a fourth selector selectable to direct the logic to activate at least a first speaker within a threshold distance of the user regardless of whether the first speaker is in the same room as the user, and not to activate a second speaker not within the threshold distance of the user.

The details of the present application, both as to its structure and operation, can be best understood in reference to the accompanying drawings, in which like reference numerals refer to like parts, and in which:

DETAILED DESCRIPTION OF THE PREFERRED EMBODIMENT

Figure 1:
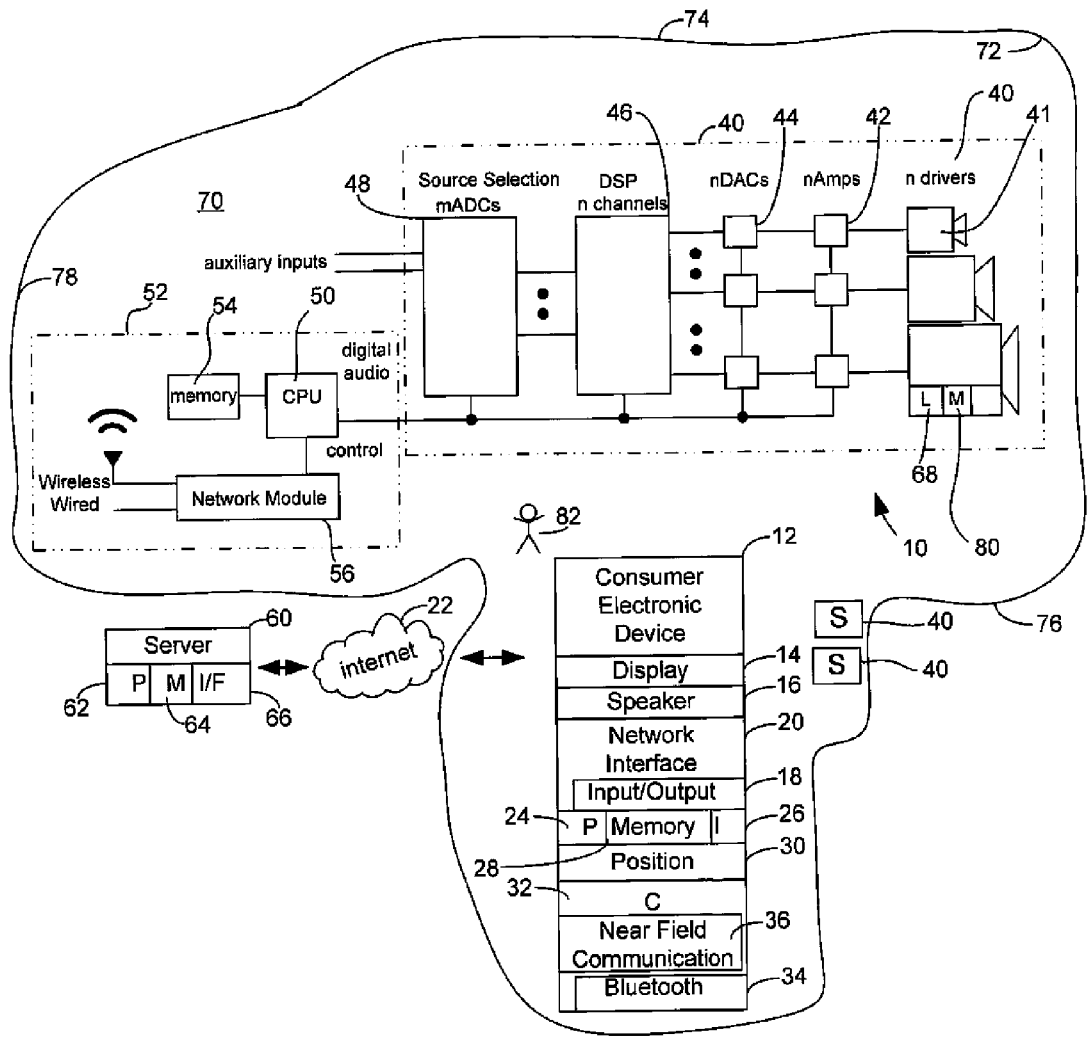
FIG. 1 is a block diagram of an example system including an example in accordance with present principles.

This disclosure relates generally to computer ecosystems including aspects of multiple audio speaker ecosystems. A system herein may include server and client components, connected over a network such that data may be exchanged between the client and server components. The client components may include one or more computing devices that have audio speakers including audio speaker assemblies per se but also including speaker-bearing devices such as portable televisions (e.g. smart TVs, Internet-enabled TVs), portable computers such as laptops and tablet computers, and other mobile devices including smart phones and additional examples discussed below. These client devices may operate with a variety of operating environments. For example, some of the client computers may employ, as examples, operating systems from Microsoft, or a Unix operating system, or operating systems produced by Apple Computer or Google. These operating environments may be used to execute one or more browsing programs, such as a browser made by Microsoft or Google or Mozilla or other browser program that can access web applications hosted by the Internet servers discussed below.

Servers may include one or more processors executing instructions that configure the servers to receive and transmit data over a network such as the Internet. Or, a client and server can be connected over a local intranet or a virtual private network.

Information may be exchanged over a network between the clients and servers. To this end and for security, servers and/or clients can include firewalls, load balancers, temporary storages, and proxies, and other network infrastructure for reliability and security. One or more servers may form an apparatus that implement methods of providing a secure community such as an online social website to network members.

As used herein, instructions refer to computer-implemented steps for processing information in the system. Instructions can be implemented in software, firmware or hardware and include any type of programmed step undertaken by components of the system.

A processor may be any conventional general purpose single- or multi-chip processor that can execute logic by means of various lines such as address lines, data lines, and control lines and registers and shift registers. A processor may be implemented by a digital signal processor (DSP), for example.

Software modules described by way of the flow charts and user interfaces herein can include various sub-routines, procedures, etc. Without limiting the disclosure, logic stated to be executed by a particular module can be redistributed to other software modules and/or combined together in a single module and/or made available in a shareable library.

Present principles described herein can be implemented as hardware, software, firmware, or combinations thereof; hence, illustrative components, blocks, modules, circuits, and steps are set forth in terms of their functionality.

Further to what has been alluded to above, logical blocks, modules, and circuits described below can be implemented or performed with a general purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

The functions and methods described below, when implemented in software, can be written in an appropriate language such as but not limited to C# or C++, and can be stored on or transmitted through a computer-readable storage medium such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hard-wired cables including fiber optics and coaxial wires and digital subscriber line (DSL) and twisted pair wires. Such connections may include wireless communication connections including infrared and radio.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

Now specifically referring to FIG. 1, an example system 10 is shown, which may include one or more of the example devices mentioned above and described further below in accordance with present principles. The first of the example devices included in the system 10 is an example consumer electronics (CE) device 12. The CE device 12 may be, e.g., a computerized Internet enabled ("smart") telephone, a tablet computer, a notebook computer, a wearable computerized device such as e.g. computerized Internet-enabled watch, a computerized Internet-enabled bracelet, other computerized Internet-enabled devices such as RFID tags, a computerized Internet-enabled music player, computerized Internet-enabled head phones, a computerized Internet-enabled implantable device such as an implantable skin device, etc., and even e.g. a computerized Internet-enabled television (TV). Regardless, it is to be understood that the CE device 12 is configured to undertake present principles (e.g. communicate with other devices to undertake present principles, execute the logic described herein, and perform any other functions and/or operations described herein).

Accordingly, to undertake such principles the CE device 12 can be established by some or all of the components shown in FIG. 1. For example, the CE device 12 can include one or more touch-enabled displays 14, one or more speakers 16 for outputting audio in accordance with present principles, and at least one additional input device 18 such as e.g. an audio receiver/microphone for e.g. entering audible commands to the CE device 12 to control the CE device 12. The example CE device 12 may also include one or more network interfaces 20 for communication over at least one network 22 such as the Internet, an WAN, an LAN, etc. under control of one or more processors 24. It is to be understood that the processor 24 controls the CE device 12 to undertake present principles, including the other elements of the CE device 12 described herein such as e.g. controlling the display 14 to present images thereon and receiving input therefrom. Furthermore, note the network interface 20 may be, e.g., a wired or wireless modem or router, or other appropriate interface such as, e.g., a wireless telephony transceiver, Wi-Fi transceiver, etc.

In addition to the foregoing, the CE device 12 may also include one or more input ports 26 such as, e.g., a USB port to physically connect (e.g. using a wired connection) to another CE device and/or a headphone port to connect headphones to the CE device 12 for presentation of audio from the CE device 12 to a user through the headphones. The CE device 12 may further include one or more tangible computer readable storage medium or memory 28 such as disk-based or solid state storage. Also in some embodiments, the CE device 12 can include a position or location receiver such as but not limited to a GPS receiver and/or altimeter 30 that is configured to e.g. receive geographic position information from at least one satellite and provide the information to the processor 24 and/or determine an altitude at which the CE device 12 is disposed in conjunction with the processor 24. However, it is to be understood that that another suitable position receiver other than a GPS receiver and/or altimeter may be used in accordance with present principles to e.g. determine the location of the CE device 12 in e.g. all three dimensions.

Continuing the description of the CE device 12, in some embodiments the CE device 12 may include one or more cameras 32 that may be, e.g., a thermal imaging camera, a digital camera such as a webcam, and/or a camera integrated into the CE device 12 and controllable by the processor 24 to gather pictures/images and/or video in accordance with present principles. Also included on the CE device 12 may be a Bluetooth transceiver 34 and other Near Field Communication (NFC) element 36 for communication with other devices using Bluetooth and/or NFC technology, respectively. An example NFC element can be a radio frequency identification (RFID) element.

Further still, the CE device 12 may include one or more motion sensors (e.g., an accelerometer, gyroscope, cyclometer, magnetic sensor, infrared (IR) motion sensors such as passive IR sensors, an optical sensor, a speed and/or cadence sensor, a gesture sensor (e.g. for sensing gesture command), etc.) providing input to the processor 24. The CE device 12 may include still other sensors such as e.g. one or more climate sensors (e.g. barometers, humidity sensors, wind sensors, light sensors, temperature sensors, etc.) and/or one or more biometric sensors providing input to the processor 24. In addition to the foregoing, it is noted that in some embodiments the CE device 12 may also include a kinetic energy harvester to e.g. charge a battery (not shown) powering the CE device 12.

In some examples the CE device 12 is used to communicate with (e.g., to control) multiple ("n", wherein "n" is an integer greater than one) speakers 40 in respective speaker housings, each of can have multiple drivers 41, with each driver 41 receiving signals from a respective amplifier 42 over wired and/or wireless links to transduce the signal into sound (the details of only a single speaker shown in FIG. 1, it being understood that the other speakers 40 may be similarly constructed). Each amplifier 42 may receive over wired and/or wireless links an analog signal that has been converted from a digital signal by a respective standalone or integral (with the amplifier) digital to analog converter (DAC) 44. The DACs 44 may receive, over respective wired and/or wireless channels, digital signals from a digital signal processor (DSP) 46 or other processing circuit. The DSP 46 may receive source selection signals over wired and/or wireless links from plural analog to digital converters (ADC) 48, which may in turn receive appropriate auxiliary signals and, from a control processor 50 of a control device 52, digital audio signals over wired and/or wireless links. The control processor 50 may access a computer memory 54 such as any of those described above and may also access a network module 56 to permit wired and/or wireless communication with, e.g., the Internet. As shown in FIG. 1, the control processor 50 may also communicate with each of the ADCs 48, DSP 46, DACs 44, and amplifiers 42 over wired and/or wireless links. In any case, each speaker 40 can be separately addressed over a network from the other speakers.

More particularly, in some embodiments, each speaker 40 may be associated with a respective network address such as but not limited to a respective media access control (MAC) address. Thus, each speaker may be separately addressed over a network such as the Internet. Wired and/or wireless communication links may be established between the speakers 40/CPU 50, CE device 12, and server 60, with the CE device 12 and/or server 60 being thus able to address individual speakers, in some examples through the CPU 50 and/or through the DSP 46 and/or through individual processing units associated with each individual speaker 40, as may be mounted integrally in the same housing as each individual speaker 40.

The CE device 12 and/or control device 52 of each individual speaker train (speaker+amplifier+DAC+DSP, for instance) may communicate over wired and/or wireless links with the Internet 22 and through the Internet 22 with one or more network servers 60. Only a single server 60 is shown in FIG. 1. A server 60 may include at least one processor 62, at least one tangible computer readable storage medium 64 such as disk-based or solid state storage, and at least one network interface 66 that, under control of the processor 62, allows for communication with the other devices of FIG. 1 over the network 22, and indeed may facilitate communication between servers and client devices in accordance with present principles. Note that the network interface 66 may be, e.g., a wired or wireless modem or router, Wi-Fi transceiver, or other appropriate interface such as, e.g., a wireless telephony transceiver.

Accordingly, in some embodiments the server 60 may be an Internet server, may include and perform "cloud" functions such that the devices of the system 10 may access a "cloud" environment via the server 60 in example embodiments. In a specific example, the server 60 downloads a software application to the CE device 12 and/or CPU 50 and/or the below-described user location systems for control of the speakers 40 according to logic below. The CE device 12 in turn can receive certain information from the speakers 40, such as their GPS location, and/or the CE device 12 can receive input from the user, e.g., indicating the locations of the speakers 40 as further disclosed below. Based on these inputs at least in part, the CE device 12 may execute the speaker optimization logic discussed below, or it may upload the inputs to a cloud server 60 for processing of the optimization algorithms and return of optimization outputs to the CE device 12 for presentation thereof on the CE device 12, and/or the cloud server 60 may establish speaker configurations automatically by directly communicating with the speakers 40 via their respective addresses, in some cases through the CE device 12. Note that if desired, each speaker 40 may include a respective one or more lamps 68 that can be illuminated on the speaker.

Typically, some of the speakers 40 are disposed in an enclosure 70 such as a room, e.g., a living room while other speakers are disposed in other rooms of the building such as a home. For purposes of disclosure, the enclosure 70 has (with respect to the example orientation of the speakers shown in FIG. 1) a front wall 72, left and right side walls 74, 76, and a rear wall 78. One or more user/listeners 82 may occupy the enclosure 70 to listen to audio from the speakers 40. One or more microphones 80 may be arranged in the enclosure for generating signals representative of sound in the enclosure 70, sending those signals via wired and/or wireless links to the CPU 50 and/or the CE device 12 and/or the server 60. In the non-limiting example shown, each speaker 40 supports a microphone 80, it being understood that the one or more microphones may be arranged elsewhere in the system if desired.

The location of the walls 72-78 of the room 70 as well as the locations of walls of other rooms and speakers therein may be input by the user using, e.g., a user interface (UI) in which the user may draw, as with a finger or stylus on a touch screen display 14 of a CE device 12, the walls 72-78 and locations of the speakers 40. Or, the position of the walls may be measured by emitting chirps, including a frequency sweep, in sequence from each of the speakers 40 as detected by each of the microphones 80 and/or from the microphone 18 of the CE device 12, determining, using the formula distance=speed of sound multiplied by time until an echo is received back, the distance between the emitting microphone and the walls returning the echoes. Note in this embodiment the location of each speaker (inferred to be the same location as the associated microphone) is known as described above. By computationally modeling each measured wall position with the known speaker locations, the contour of the enclosure 70 can be approximately mapped.

Figure 2:
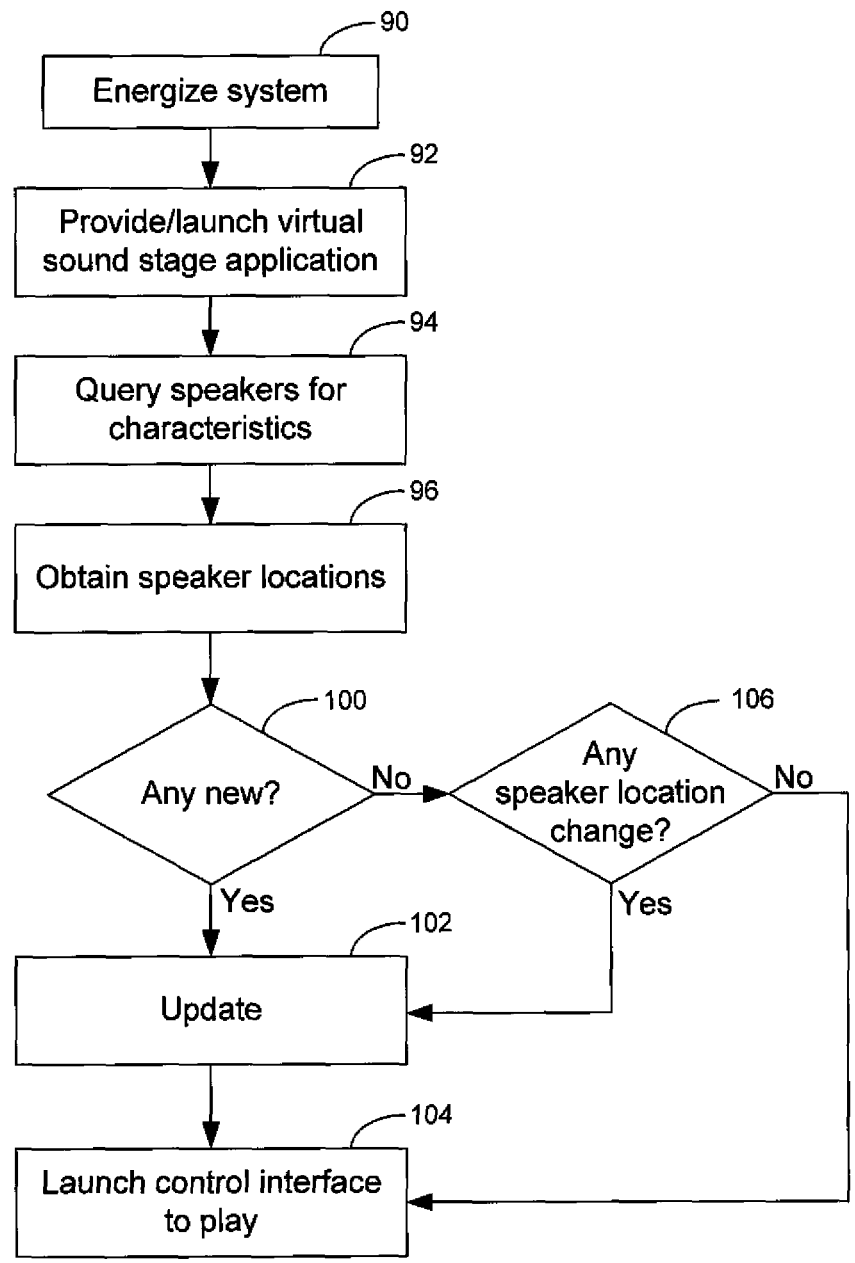
FIGS. 2 and 2A are flow charts of example non-limiting logic to obtain speaker location.

Now referring to FIG. 2, a flow chart of non-limiting example logic is shown. The logic shown in FIG. 2 may be executed by one or more of the CPU 50, the CE device 12 processor 24, and the server 60 processor 62. The logic may be executed at application boot time when a user, e.g. by means of the CE device 12, launches a control application.

Commencing at block 90, the speaker system is energized, and at block 92 an application is provided and launched, e.g., on the CE device 12 or by the server 60 controlling the speaker system or a combination thereof. A Wi-Fi or network connection to the server 60 from the CE device 12 and/or CPU 50 may be provided to enable updates or acquisition of the application or applications herein. The application may be vended or otherwise included or recommended with audio products to aid the user in achieving the best system performance. An application (e.g., via Android, iOS, or URL) can be provided to the customer for use on the CE device 12. The user initiates the application, answers questions/prompts, and controls speakers if desired. Speaker parameters such as EQ and time alignment may be updated automatically via the network.

At block 94, if the speaker characteristics have not already been obtained, the executing computer (e.g., the CE device 12) can in some examples query the speakers for their capabilities/characteristics. Relevant characteristics include frequency range the speaker is capable of reproducing, for example. Querying may be done by addressing each speaker CPU 50 by the speaker's unique network address. As mentioned earlier, wired or wireless (e.g., Wi-Fi) communication links may be established between the CE device 2 and speakers 40.

At block 96, speaker location may be obtained for each speaker identification (ID). To determine speaker location, position information may be received from each speaker 40 as sensed by a global positioning satellite (GPS) receiver on the speaker, or as determined using Wi-Fi (via the speaker's MAC address, Wi-Fi signal strength, triangulation, etc. using a Wi-Fi transmitter associated with each speaker location, which may be mounted on the respective speaker), ultra wideband (UWB) locating principles, etc. to determine speaker location, typically correlated to the room in which the speaker is disposed by noting the location of the walls discussed above and the fact that a speaker's determined location is bounded within the walls. As to UWB for example, the techniques available from DecaWave of Ireland may be to determine the locations of the speakers in the room. Some details of this technique are described in Decawave's USPP 20120120874, incorporated herein by reference. Essentially, UWB tags, in the present case mounted on the individual speaker housings, communicate via UWB with one or more UWB readers, in the present context, mounted on the CE device 12 or on network access points (APs) that in turn communicate with the CE device 12. Other techniques may be used. Or, the speaker location may be input by the user as discussed further below. The current position may be compared for each speaker to a data structure listing the previous position of that respective speaker to determine whether any speaker has moved.

Proceeding to decision diamond 100, the logic may determine whether any new speakers have been added to the system since the previous time the application was run. This may be done by comparing the unique speaker IDs to a list of previous speaker IDs and if any new IDs are detected at decision diamond 100, the logic moves to block 102 to update the speaker location list and then at block 104 a control interface may be launched, e.g., on the CE device 12, to begin the follow me feature described herein.

If no new speakers have been added, the logic may proceed to decision diamond 106 to determine whether any speaker locations have changed since the prior time the application was launched. This may be done by comparing the currently reported locations to the previously stored locations for each speaker ID. If any locations have changed, the logic may loop to block 102 to proceed as described. Otherwise, the logic may proceed to the launch of the control interface at block 104.

Figure 2A:
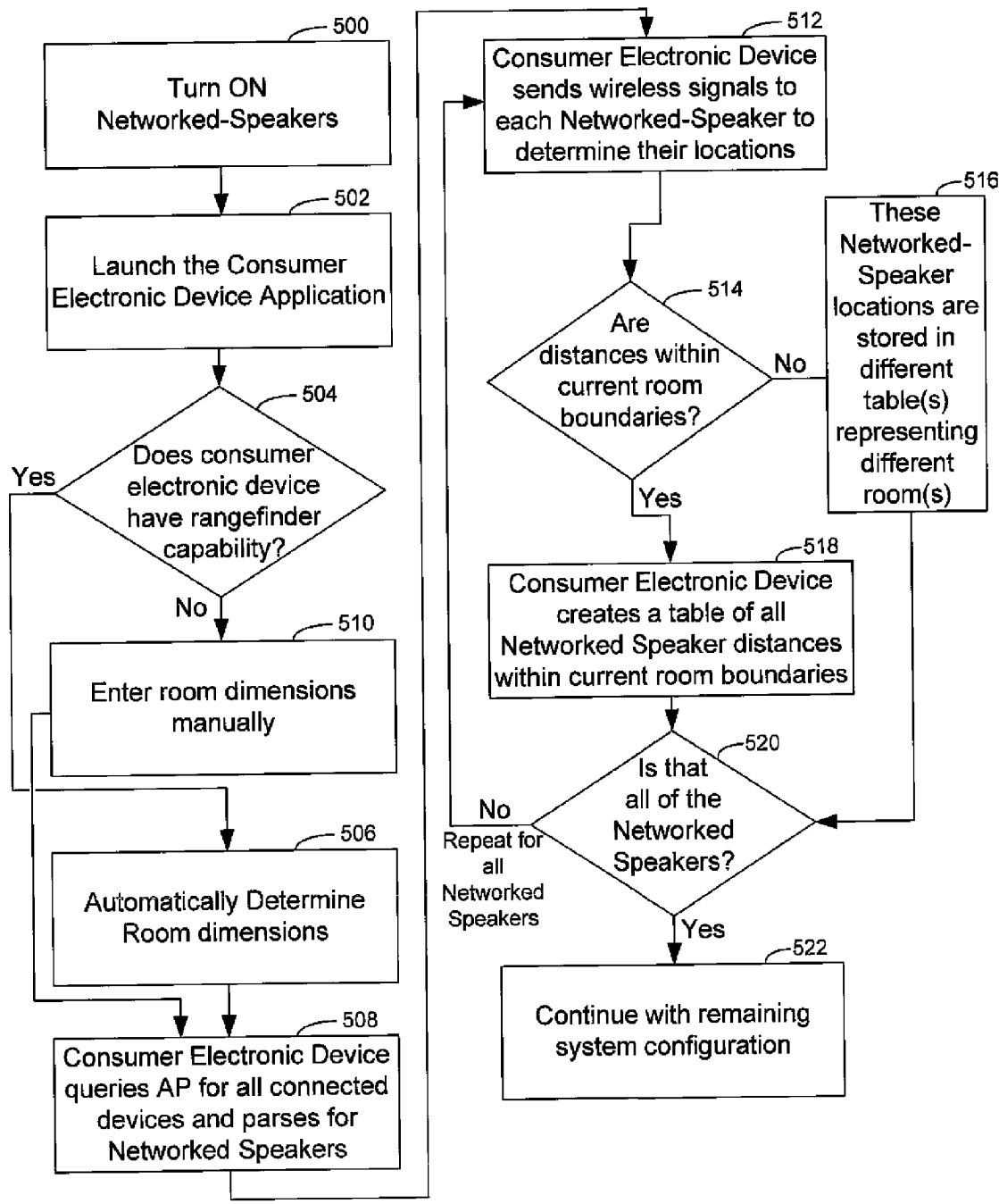

FIG. 2A illustrates supplemental logic in addition to or in lieu of some of the logic disclosed elsewhere herein that may be employed in example non-limiting embodiments to discover and map speaker location and room (enclosure 70) boundaries. Commencing at block 500, the speakers are energized and a discovery application for executing the example logic below is launched on the CE device 12. If the CE device 12 has range finding capability at decision diamond 504, the CE device (assuming it is located in the enclosure) automatically determines the dimensions of the enclosure in which the speakers are located relative to the current location of the CE device 12 as indicated by, e.g., the GPS receiver of the CE device. Thus, not only the contours but the physical locations of the walls of the enclosure are determined. This may be executed by, for example, sending measurement waves (sonic or radio/IR) from an appropriate transceiver on the CE device 12 and detecting returned reflections from the walls of the enclosure, determining the distances between transmitted and received waves to be one half the time between transmission and reception times the speed of the relevant wave. Or, it may be executed using other principles such as imaging the walls and then using image recognition principles to convert the images into an electronic map of the enclosure.

From block 506 the logic moves to block 508, wherein the CE device queries the speakers, e.g., through a local network access point (AP), by querying for all devices on the local network to report their presence and identities, parsing the respondents to retain for present purposes only networked audio speakers. On the other hand, if the CE device does not have rangefinding capability the logic moves to block 510 to prompt the user of the CE device to enter the room dimensions.

From either block 508 or block 510 the logic flows to block 512, wherein the CE device 12 sends, e.g., wirelessly via Bluetooth, Wi-Fi, or other wireless link a command for the speakers to report their locations. These locations may be obtained by each speaker, for example, from a local GPS receiver on the speaker, or a triangulation routine may be coordinated between the speakers and CE device 12 using ultra wide band (UWB) principles. UWB location techniques may be used, e.g., the techniques available from DecaWave of Ireland, to determine the locations of the speakers in the room. Some details of this technique are described in Decawave's USPP 20120120874, incorporated herein by reference. Essentially, UWB tags, in the present case mounted on the individual speaker housings, communicate via UWB with one or more UWB readers, in the present context, mounted on the CE device 12 or on network access points (APs) that in turn communicate with the CE device 12. Other techniques may be used.

The logic moves from block 512 to decision diamond 514, wherein it is determined, for each speaker, whether its location is within the enclosure boundaries determined at block 506. For speakers not located in the enclosure the logic moves to block 516 to store the identity and location of that speaker in a data structure that is separate from the data structure used at block 518 to record the identities and IDs of the speakers determined at decision diamond 514 to be within the enclosure. Each speaker location is determined by looping from decision diamond 520 back to block 512, and when no further speakers remain to be tested, the logic concludes at block 522 by continuing with any remaining system configuration tasks divulged herein.

Figure 3:
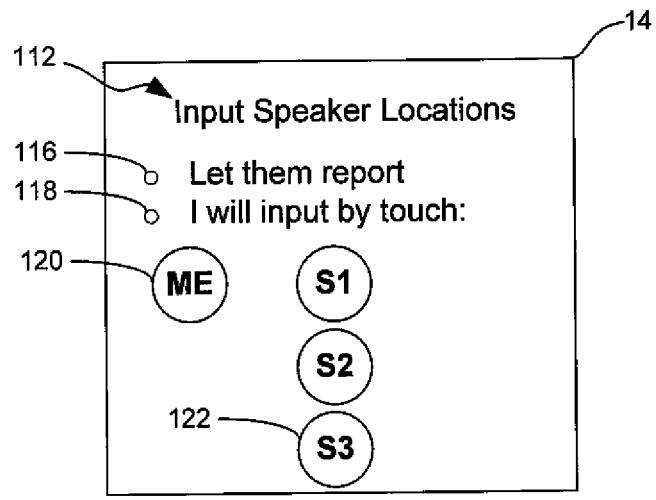
FIG. 3 is a screen shot of an example user interface (UI) allowing a user to input speaker location manually.

FIG. 3 shows a UI 112 that may be presented on the display 14 (which preferably is touch-enabled) of the CE device 12. The user may select 116 to command the speakers to report their locations as obtained by, e.g., GPS receivers on each speaker. Yet again, the user may select 118 to input the locations by touch, touching a part 120 of the display 14 indicating the listener location and parts 122 indicating speaker locations. The user may also indicate the names and/or speaker IDs of the locations 122 so that the application knows what speaker with what characteristics is located where, relative to the other speakers and to the listener location.

Figure 4:
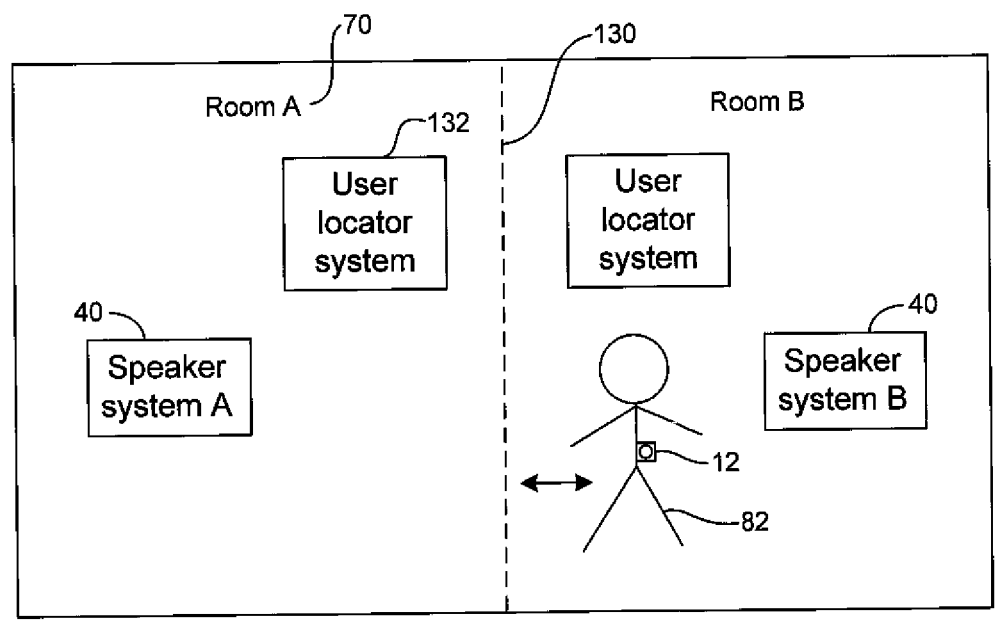
FIG. 4 is a block diagram of a multi-room enclosure such as a home illustrating present principles.

FIG. 4 shows that the enclosure 70 shown in FIG. 1 may be one room (labeled "Room A" in FIG. 4) of a multi-room building such as a home that has other rooms, including a Room B, typically separated from Room A by a wall or walls 130. While only two rooms are shown in FIG. 4 it is to be understood that additional rooms with additional speakers therein may be provided and operated according to present principles.

One or more speaker systems 40 are in each respective room as shown in FIG. 4. Each system 40 may include some or all of the components of the system 40 shown in FIG. 1 and described above. The user/listener 82 may move from room to room and may possess or wear or otherwise have a tracking device such as the CE device 12 shown in FIG. 1, which as described above can include some or all of the CE device components divulged previously.

One or more user locator systems 132 may be provided as shown. A user locator system 132 may be provided in each respective room A and B as shown or only a single system 132 may be provided in the building. Or, the user locator systems 132 may be embodied in the CE device 12, the server 60, one or more of the speaker systems 40. The function of the user locator system is to track the location of the user 82 as he roams around the building and energize and de-energize speakers 40 as appropriate.

It will be appreciated that wherever located or embodied, the user locators are network devices, i.e., they communicate with the local home entertainment network and/or Internet. An example user locator 132 thus may include a sensor such as a Bluetooth receiver, RFID receiver, Wi-Fi receiver, UWB receiver, or other receiver configured to receive user presence signals depending on the protocol used. The example user locator also typically includes a network interface to communicate commands to the Internet and/or to the home network. In effect, some or all of the components of the CE device 12 shown in FIG. 1 may be duplicated in the user locator or locators 132 described herein.

In some embodiments, the CE device 12 is worn or carried by the user and may be established by the user's smart phone, other mobile device such as a mobile computer, or a location tag such as an RFID tag, a Wi-Fi tag, a UWB, or other wireless tag to track the user's location within the home to enable switching networked speakers on and off based on user location or proximity to each network speaker.

Figure 5:
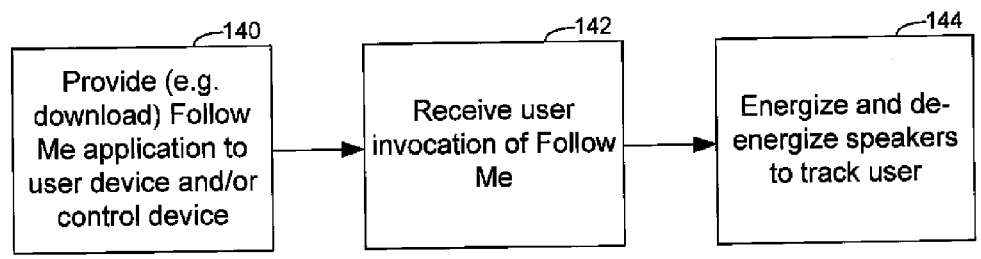
FIGS. 5-8 are flow charts of example "follow me" logic.

FIG. 5 shows overall logic. Commencing at block 140, computer instructions, referred to herein colloquially as a "follow me app", may be provided to, for instance, the CE device 12 and/or the CPU 50 and/or the user locator systems 132 and/or the server 60. The instructions may be downloaded over the Internet upon user download or may be provided at manufacturing time or by other means.

At block 142, a user invocation of the software may be received, e.g., at the CE device 12, and then at block 144 speakers 40 in the home may be energized and de-energized as appropriate to track the user as the user roams about the building. In some cases discussed below, only speakers in the room in which the user is located are activated; the others are deactivated. In other embodiments speakers that are within a threshold distance of the user are activated regardless of whether they are in the same room as the user, with speakers beyond the threshold distance being deactivated.

Figure 6:
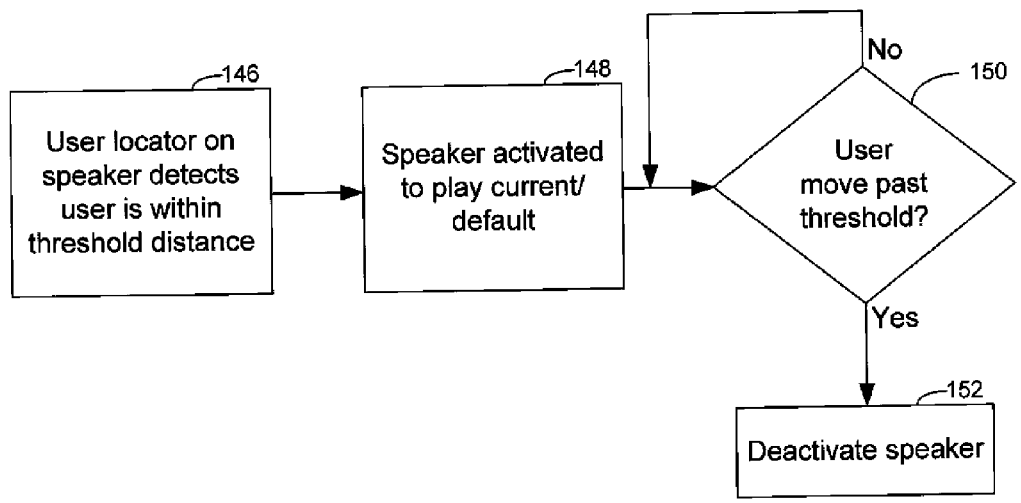
Figure 7:
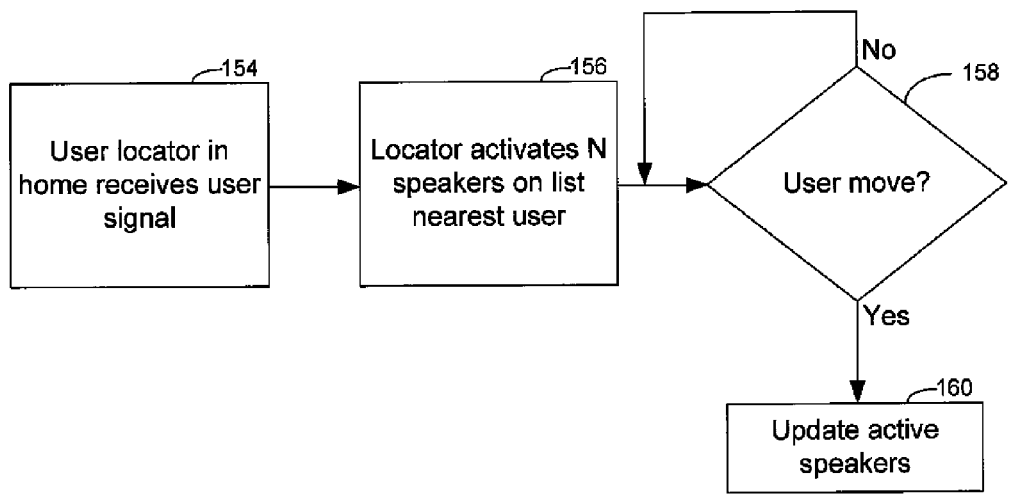
Figure 8:
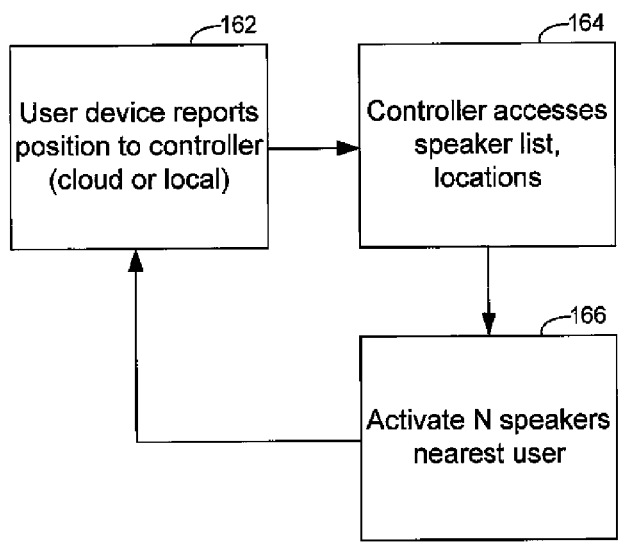

FIGS. 6-8 show example logic of the follow-me feature discussed above. At block 146 of FIG. 6, a respective user locator 132 that is mounted on each speaker 40 monitors for predetermined signals from the CE device 12, on the assumption that the CE device 12 is co-located with the user. In this embodiment, the CE device 12 need not execute instructions beyond periodically sending a presence signal on a predetermined protocol, e.g., Bluetooth, RFID, UWB, Wi-Fi, etc. When a user locator on a speaker, based on the presence signal, determines that the user is within a threshold distance of the speaker, it activates the speaker at block 148. The speaker is activated to play either whatever audio the user currently has commanded the home entertainment system to play, or it is activated to play a default audio. For example, if no audio currently has been initiated the user may elect to have speakers energized in a room into which the user enters to play a default sound track, radio station, etc. Activation may be accomplished by a network command from the locator to the CPU 50 and/or DSPs 46, for example, recalling that in some embodiments the locator is the CPU 50.

In determining whether the user is within the threshold distance of the speaker based on the presence signal, the locator may simply assume that any detection of a CE device presence signal indicates that a user is within the threshold distance. Or, the locator may make the determination that the user is within the threshold distance only in response to a CE device presence signal who signal strength satisfies a threshold signal strength. Yet again, for protocols such as certain UWB protocols that may measure distance directly, the user's actual distance as indicated by the position of the CE device relative to the speaker doing the test may be compared to a stored threshold value and if within that value, the speaker is activated. It is to be understood that the system can enable the user to input or otherwise establish a network ID of a particular CE device to be monitored so that the logic of FIG. 6 is undertaken only for that CE device (or device(s)) and no others.

Decision diamond 150 indicates that when the user locator of a speaker determines that the user has moved beyond the threshold distance from the speaker, the speaker is deactivated at block 152.

FIG. 7 illustrates that the user locator executing the proximity logic may be mounted separately from the speakers, e.g., the user locator may be distributed in separate components on respective walls in respective rooms, or only a single locator mounted on a wall in a central location may be used. At block 154 the user locator receives a user presence signal (e.g., from the CE device 12) and at block 156 activates the speakers that are nearest the origin of the presence signal. To do this, the locator may access the speaker list discussed above and determine based on the presence signal which speaker(s) are closest to the origin, activating those speakers at block 156. When the locators are distributed into respective rooms, signal strength at each locator may be compared against a threshold signal strength and if equal to or greater than the threshold, the locator may determine that the user (using as a surrogate the CE device 12) is within the threshold distance of the speakers in that room, activating those speakers. Otherwise, the locator in a room does not activate the speakers in that room. In contrast, when only a single, central locator is used, it access the speaker list with locations and compares the signal strength of the presence signal against a threshold. A signal strength above the threshold can result in the locator activating the speakers closest to it, the locator, and deactivating the speakers further away from the locator position. A signal strength below the threshold can result in the locator deactivating the speakers closest to it, the locator, and activating the speakers further away from the locator position. Note that decision diamond 158 simply indicates that when the user moves as indicated by the presence signal, the active/inactive speaker groups are updated as appropriate at block 160 according to logic above.

FIG. 8 shows logic when the user locator is in a controller disposed locally with respect to the building in which the speakers 40 are disposed, e.g., in the CE device 12 or the CPU 50, or hosted remotely in the cloud, e.g., on the server 60. Commencing at block 162, the user's device reports its position to the controller. The position may be a geographic position received via GPS for example, or it may be a relative location from triangulation using, e.g., UWB. At block 164 the controller accesses the speaker list with locations, e.g., over a network or bus linking the controller with the storage medium containing the list, and at block 166 the "N" speakers nearest the location of the user's device (N being an integer at least equal to one) are activated. Speakers beyond a threshold distance from the user's location are not activated.

Figure 9:
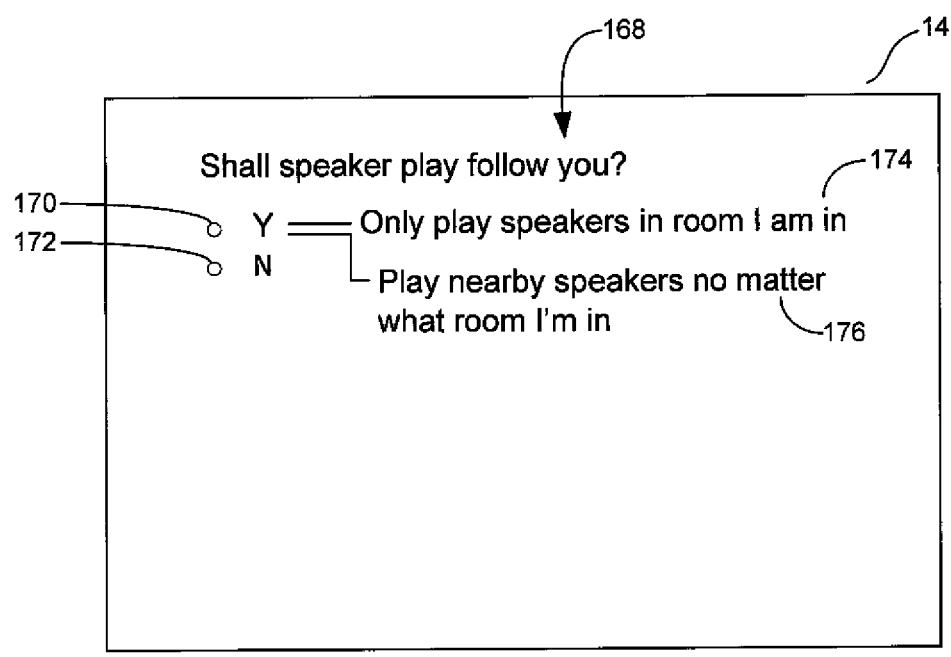
FIG. 9 is an example user interface (UI) according to present principles.

This discussion now flows into the UI 168 of FIG. 9, in which the user is presented with an option 170 to activate the above-described "follow me" logic and an option 172 not to activate the follow me logic. If the user selects "follow me" 170, the user may be presented with a sub-menu with a selector 174 permitting the user to direct the logic to activate speakers only within the room in which the user is located, maintaining all other speakers deactivated. The user may also be presented with a selector 176 permitting the user to direct the logic to activate nearby speakers (speakers within a threshold distance that may be preset and/or established by the user) regardless of whether those speakers are in the same room as the user, with speakers beyond the threshold distance being deactivated.

While the particular NETWORKED SPEAKER SYSTEM WITH FOLLOW ME is herein shown and described in detail, it is to be understood that the subject matter which is encompassed by the present invention is limited only by the claims.

What is claimed is:

1. A system comprising:
 at least one computer readable storage medium bearing instructions executable by a processor;
 at least one hardware processor configured for accessing the at least one computer readable storage medium to execute the instructions to configure the at least one processor for:
 receiving, at least at a first locator distanced from and outside of respective housing of at least first and second speakers located in respective first and second rooms of the building, predetermined wireless signals from an electronic device associated with a user;
 accessing a speaker list;
 determining, based on the wireless signals, which speaker(s) in the list are closest to the electronics device; and
 based at least in part on the determining, activating or not activating the speakers.

2. The system of claim 1, wherein the at least one locator is established by at least first and second locator units disposed in respective first and second rooms in a building.

3. The system of claim 2, wherein the at least one processor when executing the instructions is configured for comparing signal strength of the signals received at each locator unit against a threshold signal strength and responsive to signal strength at a first locator unit satisfying the threshold, activating the respective speaker in the room in which the first locator unit is disposed.

4. The system of claim 1, wherein the at least one locator is established by one and only one locator unit.

5. The system of claim 4, wherein the at least one processor when executing, the instructions is configured for:

comparing signal strength of the signal received by the one and only one locator unit to a threshold;

responsive to a determination that the signal satisfies the threshold, activating or maintaining activated at least one speaker closest the locator unit, and deactivating or maintaining deactivated at least one speaker further away from the locator unit than the at least one speaker closest the locator unit; and responsive to a determination that the signal does not satisfy the threshold, deactivating or maintaining deactivated at least one speaker closest the locator unit, and activating or maintaining activated at least one speaker further away from the locator unit than the at least one speaker closest the locator unit.

6. The system of claim 1, herein the wireless signals are established by one or more of radiofrequency identification signals, Wi-Fi signals, Bluetooth signals, ultra wideband signals.

7. Device comprising:
at least one computer readable storage medium bearing instructions executable by a processor;
at least one processor configured for accessing the at least one computer readable storage medium to execute the instructions to configure the at least one processor for:
presenting on a display a user interface (UI) including:
a first selector selectable to enable logic to activate and deactivate speakers in a building as a user moves in the building,
a second selector selectable to disable logic to activate and deactivate speakers in a building as a user moves in the building;
a third selector selectable to direct the logic to activate speakers only within a room in which the user is located, maintaining all other speakers in the building deactivated; and
a fourth selector selectable to direct the logic to activate at least a first speaker within a threshold distance of the user regardless of whether the first speaker is in the same room as the user, and not to activate a second speaker not within the threshold distance of the user.

8. A method comprising:
receiving, at least at a first locator distanced in a building from and outside of respective housings of at least first and second speakers located in respective first and second rooms of the building, predetermined wireless signals from an electronic device associated with a user;
accessing a speaker list;
determining, based on the wireless signals, which speaker(s) in the list are closest to the electronics device; and
based at least in part oil the determining, activating or not activating the speakers.

9. The method of claim 8, wherein the at least one locator is established by at least first and second locator units disposed in respective first and second rooms in a building.

10. The method of claim 9, comprising comparing signal strength of the signals received at each locator unit against a threshold strength and responsive to signal strength at a first locator unit satisfying the threshold, activating the respective speaker in the room in which the first locator unit is disposed.

11. The system of claim 8, wherein the at least on locator is established by one and only one locator unit.

12. The method of claim 11, comprising:
comparing signal strength of the signal received by the one and only one locator unit to a threshold;
responsive to a determination that the signal satisfies the threshold, activating or maintaining activated at least one speaker closest the locator unit, and deactivating or maintaining deactivated at least one speaker further away from the locator unit than the at least one speaker closest the locator unit; and
responsive to a determination that the signal does not sans the threshold, deactivating or maintaining deactivated at least one speaker closest the locator unit, and activating or maintaining activated at least one speaker further away from the locator unit than the at least one speaker closest the locator unit.

13. The method of claim 8, wherein the wireless signals are established by one or more of radiofrequency identification signals, Wi-Fi signals, Bluetooth signals, ultra wideband signals.

14. A method comprising:
presenting on a display a riser interface (UI) including:
a first selector selectable to enable logic to activate and deactivate speakers in a building as a user moves in the building,
a second selector selectable to disable logic to activate and deactivate speakers in a building as a user moves in the building;
a third selector selectable to direct the logic to activate speakers only within a room in which the user is located, maintaining all other speakers in the building deactivated; and
a fourth selector selectable to direct the logic to activate at least a first speaker within a threshold distance of the user regardless of whether the first speaker is in the same room as the user, and not to activate a second speaker not within the threshold distance of the user.

* * * * *